(12) United States Patent
Patel et al.

(10) Patent No.: US 8,608,819 B2
(45) Date of Patent: Dec. 17, 2013

(54) FILTER DEVICE FOR FILTERING GASEOUS FLUIDS

(75) Inventors: Ankur Patel, River Edge, NJ (US); Cedric Daekam, Lauf an der Pagnitz (FR)

(73) Assignee: Mann+Hummel GmbH, Ludwigsburg (DE)

( * ) Notice: Subject to any disclaimer, the term of this patent is extended or adjusted under 35 U.S.C. 154(b) by 506 days.

(21) Appl. No.: 12/746,605

(22) PCT Filed: Dec. 4, 2008

(86) PCT No.: PCT/EP2008/066822
§ 371 (c)(1),
(2), (4) Date: Sep. 7, 2010

(87) PCT Pub. No.: WO2009/071636
PCT Pub. Date: Jun. 11, 2009

(65) Prior Publication Data
US 2010/0326396 A1 Dec. 30, 2010

Related U.S. Application Data

(60) Provisional application No. 61/012,261, filed on Dec. 7, 2007.

(51) Int. Cl.
*B01D 39/14* (2006.01)
*B01D 39/06* (2006.01)
*B01D 24/00* (2006.01)
*B01D 50/00* (2006.01)

(52) U.S. Cl.
USPC ............... 55/522; 55/523; 55/524; 422/169; 422/170; 422/171; 422/172; 422/177; 422/178; 422/179; 422/180; 422/181; 422/182

(58) Field of Classification Search
USPC ............. 55/522–524; 422/169–172, 177–182
See application file for complete search history.

(56) References Cited

U.S. PATENT DOCUMENTS

| | | | |
|---|---|---|---|
| 1,729,135 A | 9/1929 | Slauson | |
| 4,439,321 A * | 3/1984 | Taki et al. | 210/493.1 |
| 4,498,989 A * | 2/1985 | Miyakawa et al. | 210/450 |
| D396,098 S * | 7/1998 | Gillingham et al. | D23/365 |
| 5,902,364 A * | 5/1999 | Tokar et al. | 55/498 |
| D428,128 S * | 7/2000 | Gillingham et al. | D23/365 |
| 7,527,666 B2 * | 5/2009 | Kramer et al. | 55/521 |
| 7,967,887 B1 * | 6/2011 | Yonushonis et al. | 55/523 |
| 2002/0090324 A1 * | 7/2002 | Badeau et al. | 422/171 |
| 2003/0190269 A1 * | 10/2003 | Liu et al. | 422/168 |
| 2004/0118771 A1 | 6/2004 | Schukar | |

FOREIGN PATENT DOCUMENTS

| | | |
|---|---|---|
| DE | 10128937 | 1/2003 |
| WO | W09740908 | 11/1997 |

OTHER PUBLICATIONS

PCT Search report for PCT/EP2008/066822.

* cited by examiner

*Primary Examiner* — Amber Orlando
(74) *Attorney, Agent, or Firm* — James Hasselbeck (57) ABSTRACT

A filter device for filtering gaseous fluids has a spiral-shaped wound filter path having parallel flow channels for the fluid. The flow channels end in a wound state at an axial face of the filter element at axially different positions. At the second, opposite axial face, the filter element has a geometry deviating from that of the first face.

6 Claims, 6 Drawing Sheets

FILTER DEVICE FOR FILTERING GASEOUS FLUIDS

CROSS REFERENCE TO RELATED APPLICATIONS

This application is US National Stage Entry of international patent application no. PCT/EP2008/066822, filed Dec. 4, 2008 designating the United States of America, the entire disclosure of which is incorporated herein by reference. Priority is claimed based on U.S. Provisional Patent Application 61/012,261 filed Dec. 7, 2007.

TECHNICAL FIELD

The invention concerns a filter device for filtration of gaseous fluids, in particular, an air filter in internal combustion engines, according to the preamble of claim 1.

PRIOR ART

An air filter is disclosed in EP 0 900 115 B1. The air filter comprises a filter element with round cross-section that comprises a spirally rolled filter sheet wherein the filter sheet is combined of a corrugated and a flat layer so that between flat and corrugated layers flow channels are formed. These flow channels expand in the rolled state of the filter element in axial direction and serve for introducing or discharging the fluid to be purified.

The flow channels are embodied to be alternatingly open or closed off at the end faces so that no flow channel is continuously open in axial direction and the fluid that has entered the filter element at the inflow side is forced to pass radially through the walls of the flow channels into neighboring channels by means of which axial discharge is possible. Closure of the flow channels at the axial end faces is realized by means of an adhesive bead.

The filter element is wound in the manner of a truncated cone in that the inwardly positioned windings are displaced axially relative to the outwardly positioned windings. In this way, at the inflow side as well as at the oppositely positioned outflow side of the filter element a truncated cone shape results wherein the axial total length is defined by the outwardly positioned windings at the inflow side and the inwardly positioned windings at the outflow side. It is said that, as a result of the truncated cone shape of the filter element, pressure advantages are obtainable.

The invention has the object to provide with simple constructive measures a filter device for filtration of gaseous fluids that is characterized by a high filtration capacity with improved adaptation to the mounting space.

This object is solved in accordance with the invention with the features of claim 1. The dependent claims provide expedient further embodiments.

SUMMARY OF THE INVENTION

The filter device according to the invention is used for filtration of gaseous fluids, in particular, as an air filter for filtration of the combustion air to be supplied to the cylinders of an internal combustion engine. In principle, however, other applications are conceivable, for example, the filtration of the air to be supplied to the interior of the vehicle.

The filter device has a filter element with a spirally rolled filter sheet that has parallel extending flow channels for the fluid to be purified. As a filter sheet, for example, a corrugated filter layer is used onto which a flat filter layer is glued wherein as a result of the corrugations flow channels are formed. By rolling the filter sheet, in the circumferential direction as well as in the radial direction a plurality of flow channels are formed that run adjacent to one another and extend in the axial direction of the filter element.

The flow channels are embodied to be alternatingly open or closed off at oppositely positioned axial end faces so that no flow channel is embodied to extend continuously in axial direction but, instead, a first plurality of the flow channels are open at the axial inflow side and are closed off at the oppositely positioned outflow side and a second plurality of the flow channels are closed off at the inflow side and open at the oppositely positioned outflow side. In this way, the fluid introduced through the inflow side into the filter element is forced to permeate within the flow channels the radial walls of the flow channels and to pass into neighboring flow channels through which an axial discharge may be realized.

In order to be able to provide an improved adaptation to the structural factors, so that a given mounting space is filled out by the filter element in the best possible way and in this way a higher filter surface area and thus inherently an improved filtration capacity may be obtained, the filter element is designed such that, for example, all flow channels at one axial end face of the filter element are positioned in a common end face plane and thus end at the same axial position. At the oppositely positioned axial end face however the flow channels end at different axial positions wherein the maximum extension of the filter element may be determined by radially inwardly positioned as well as radially outwardly positioned windings with flow channels disposed therein. In this way, it is possible to provide an adaptation to the given mounting conditions, respectively, and to utilize the mounting space that is available for the filter element in an optimal way. For example, a tapering cross-sectional shape of a passage receiving the filter element can be filled out by means of a conically shaped end face of the filter element. Conversely, it is also possible to provide at the end face an inwardly oriented cone where radially outwardly positioned windings have a greater axial length than the radially inwardly positioned windings, for example, in case that in the passage in which the filter element is received an obstacle in the form of a centrally projecting object is present.

Basically, the planar end of the flow channels at the first end face of the filter element provides an expedient embodiment; however, the invention is not limited to this but also all embodiments are conceivable in which at the oppositely positioned end faces different geometries are formed. For example, the end faces can be mirror-symmetrically provided with conical, outwardly curved geometry.

At one end face of the filter element, any three-dimensionally shaped geometry may be formed wherein preferably cone-shaped or truncated cone-shaped geometries are used. They can be formed with straight lateral surfaces as well as with curved lateral surfaces, preferably convexly curved lateral surfaces. However, also conceivable are geometries in which in radial direction different windings of the filter sheet have a different axial length wherein in radial direction a multiple increase and decrease in axial length is possible so that a wave shape results in radial direction.

According to a preferred embodiment, the filter sheet in the not-yet rolled, flat and spread-out state is embodied as a trapezoid, in particular as an oblique-angled trapezoid with parallel terminal edges of different lengths wherein the terminal edges represent the start of rolling and the end of rolling of the filter element. The flow channels extend parallel to the terminal edges. A different overall geometry of the filter element results upon rolling because of the terminal edges with different lengths, depending on the shape of the lateral edges that connect the terminal edges, respectively.

In a preferred embodiment, a first lateral edge is positioned at a 90 degree angle relative to both terminal edges, while the oppositely positioned lateral edge is connected at an angle deviating from 90 degrees to the two terminal edges. The first lateral edge positioned at a 90 degree angle ensures that the filter element at one end face is formed with flow channels that end in a common plane. The second lateral edge that relative thereto extends at a slant enables on the other hand a conical shape of the oppositely positioned end face wherein, depending on the rolling direction, the cone is curved inwardly or outwardly. When rolling is started at the longer terminal edge, an outwardly curved cone results whose lateral edges taper in outward axial direction. However, when rolling is started at the shorter terminal edge, an inwardly curved cone is produced in such a way that the lateral edges of the cone extend radially from the exterior to the interior and axially in the direction toward the interior of the filter element.

As an alternative to a straight lateral edge that is positioned at an angle to the terminal edges, a curved lateral edge can also be selected so that, for example, convexly or concavely curved cone-shaped geometries at one end face can be achieved.

In order to close off the flow channels at the axial end faces, an adhesive bead is expediently applied onto the filter sheet along each lateral edge. In order for the flow channels to be open or closed off alternatingly, it is expedient in this connection to apply the adhesive bead at different faces of the filter sheet so that each flow channel is closed off only at one end face and the oppositely positioned end face is open. Moreover, in this way the alternating opening and closing of the flow channels is achieved so that at each axial end face of the filter element a first plurality of the flow channels is open and a second plurality of the flow channels is closed off.

The filter sheet is preferably embodied as a corrugated filter layer wherein the flow channels will extend as a result of the corrugated shape in axial direction of the rolled filter element. It may be expedient to place the corrugated filter layer onto a flat filter layer and to join it therewith wherein, on the face of the corrugated filter layer that is facing the flat filter layer as well as on the face of the corrugated filter layer that is facing away from the flat filter layer, axially extending flow channels are formed that are to be kept open or closed off alternatingly by appropriate adhesive measures.

The filter device in its embodiment as an air filter for internal combustion engines is used in an intake module of the internal combustion engine which is a component of the intake manifold. The intake passage in the intake module by means of which the combustion air is to be supplied to the cylinders of the internal combustion engine has in this connection expediently a non-constant cross-section to which the geometry of the filter element may be matched by an appropriate design of the lateral edges of the flat spread-out filter sheet.

In a method for producing a filter device for filtration of gaseous fluids an adhesive bead each is applied along the two lateral edges of the filter sheet during the winding process. This is done, for example, by employing an adhesive applicator that is synkinetically moved above the filter sheet to be glued and rolled, in particular at a feed speed that corresponds to the rolling speed.

BRIEF DESCRIPTION OF THE DRAWINGS

Further advantages and expedient embodiments can be taken from the additional claims, the figure description, and the drawings. It is shown in:

In the Figures same components are provided with same reference numerals.

Embodiments of the Invention

Figure 1:
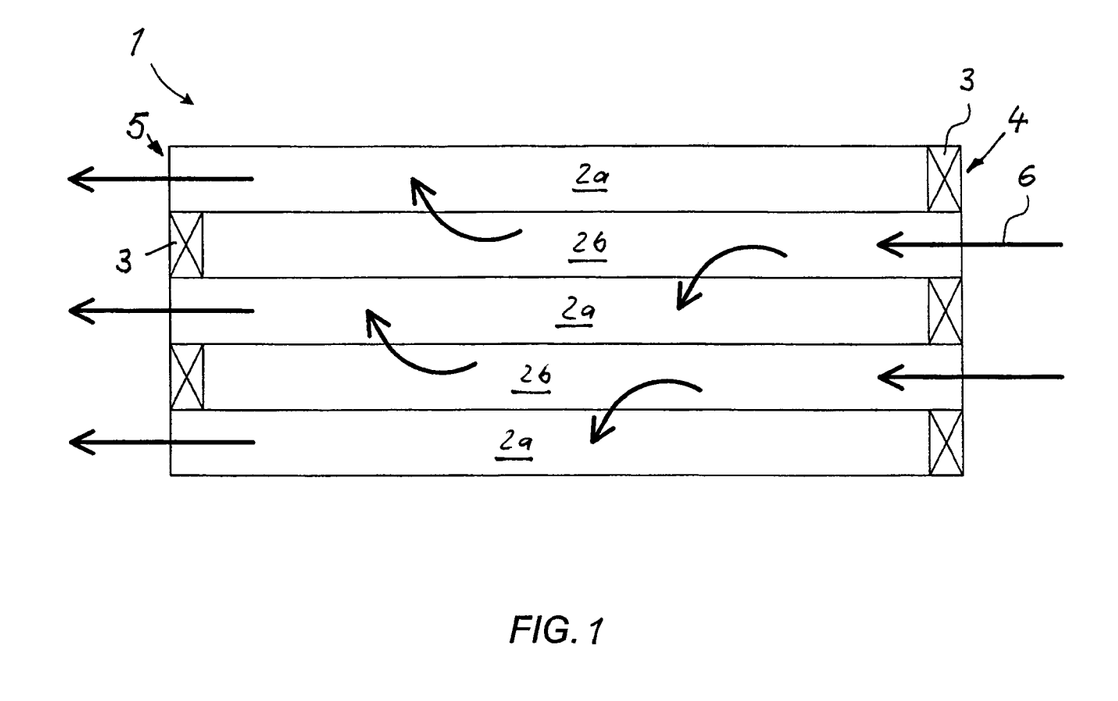
FIG. 1 the rolled filter element in longitudinal section with a plurality of flow channels for the fluid to be purified wherein the flow channels at oppositely positioned axial end faces are alternatingly open or closed off.

The filter element 1 illustrated in FIG. 1 basically belongs to the prior art and will be utilized to explain the basic function. The filter element 1 is formed as a rolled body that, in axial direction, is to be flowed through by the fluid to be filtered, in particular combustion air. For this purpose, in the filter element 1 flow channels 2*a*, 2*b* extending in axial direction are formed that are alternatingly open or closed off at the axial end faces. Each flow channel is open only at one of the end faces and is closed off at the oppositely positioned end face. At the inflow side 4 through which the fluid to be purified enters in flow-through direction 6 a first plurality of the flow channels is closed off, namely by means of an adhesive 3 that is arranged at the axial inflow side 4 for the flow channels 2*a*. However, the flow channels 2*b* are open at the axial inflow side 4.

At the outflow side 5 the flow channels 2*a* are open so that through these flow channels 2*a* the fluid to be purified can flow out. On the other hand, the flow channels 2*b* through which the fluid is introduced into the filter element 1 are closed off at the outflow side 5 by means of adhesive 3.

The fluid that has been introduced in the direction of arrow 6 into the flow channels 2*b* that are open at the inflow side is forced, as a result of closure at the outflow side 5, to permeate the walls of the flow channels radially and to pass into the neighboring flow channels 2a that are open at the outflow side. Through these flow channels 2a the axial discharge of the purified fluid is realized.

Figure 2:
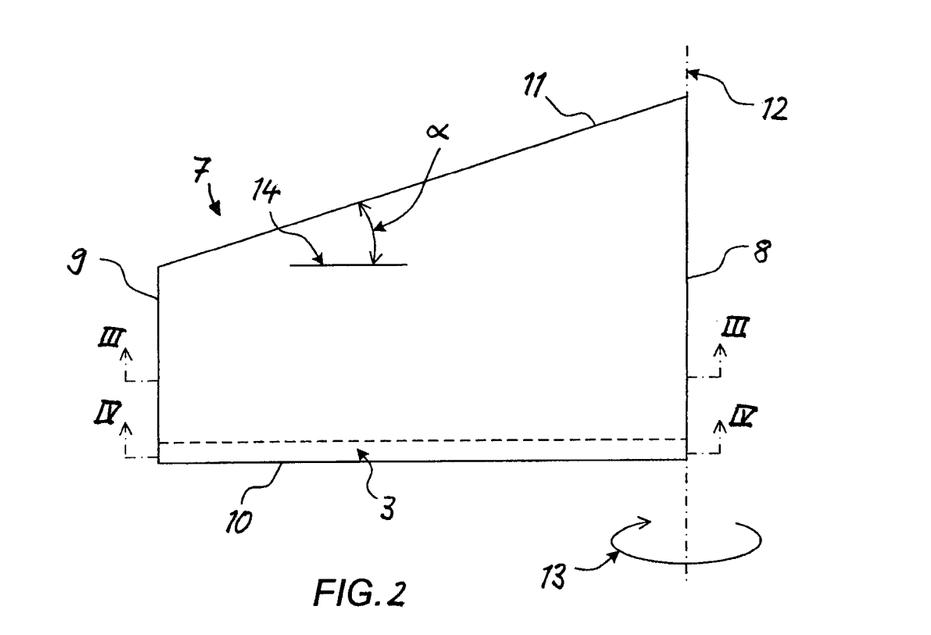
FIG. 2 the filter sheet from which the filter element is formed by rolling shown in a flat, spread-out state wherein the filter sheet is trapezoid-shaped.
Figure 2A:
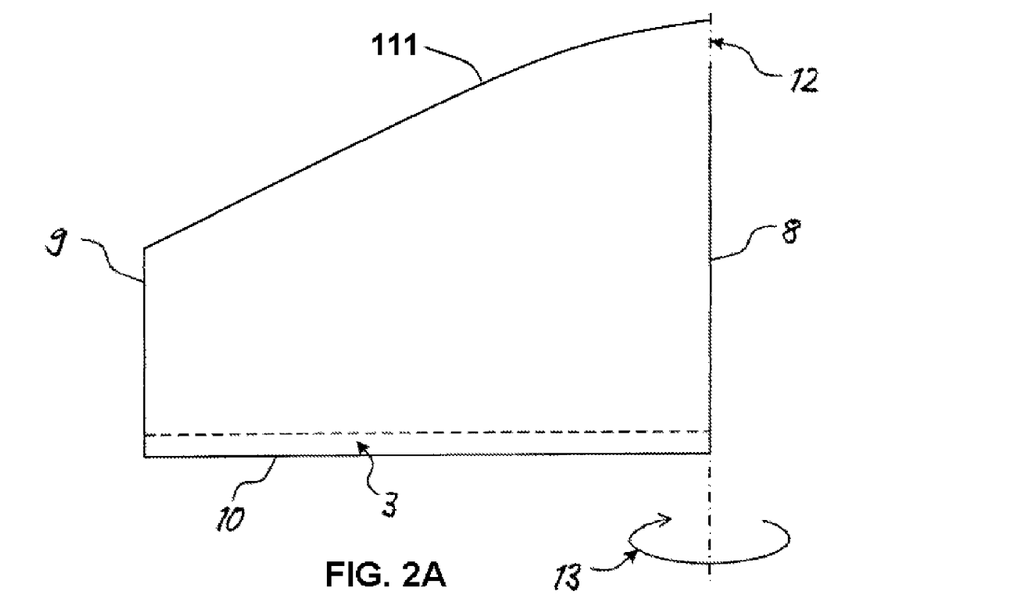
FIG. 2A shown schematically is the filter sheet from which the filter element is formed by rolling shown in a flat, spread-out state wherein the filter sheet has a curved lateral edge.

In FIG. 2, a filter sheet 7 is illustrated in the flat, spread-out state. The filter element is produced by rolling the filter sheet 7 about the axis 12 in the direction of arrow 13. In this connection, the axis 12 is positioned at a terminal edge 8 of the filter sheet 7 in the flat, spread-out state of the filter sheet 7 and at the beginning of the rolling action.

The filter sheet 7 in the spread-out state has a trapezoidal shape and is provided with two terminal edges 8 and 9 positioned opposite one another and parallel to one another and provided with different lengths; at their terminal points they are connected by lateral edges 10 and 11. The first lateral edge 10 is positioned at a right angle relative to the two terminal edges 8 and 9. The second terminal edge 11 is instead angularly oriented; the lateral edge 11 is positioned relative to an orthogonal line 14 that is perpendicular to the terminal edges 8 and 9 at an angle a that is greater than 0 degrees and smaller than 90 degrees. In the embodiment the angle a is approximately 20 degrees.

As indicated by the direction of arrow 13 and the axis 12, the rolling process begins at the longer terminal edge 8 and is continued in the direction of the oppositely positioned shorter terminal edge 9. In this way, in the completed rolled state a filter element is obtained that in the area of the oblique-angled lateral edge 11 has a conical shape. The oppositely positioned end face of the filter element however, as a result of the orthogonal orientation of the first lateral edge 10 relative to the terminal edges 8 and 9, is cylindrically shaped. The cylinder shape of the completed rolled filter element extends, viewed in axial direction of the filter element, across the length of the shorter terminal edge 9. In the area of the oblique-angled lateral edge 11, the cone-shaped section adjoins whose axial length matches the difference between the length of the longer terminal edge 8 and the shorter terminal edge 9.

Figure 3:
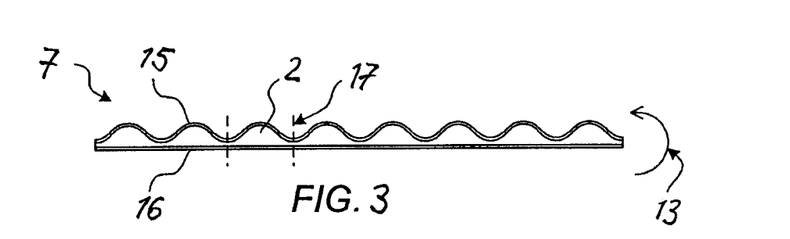
FIG. 3 a section illustration according to section line III-III of FIG. 2 with a filter sheet comprised of a corrugated layer and a flat layer.

As can be seen in the illustration of FIG. 3, the filter sheet 7 is comprised of a corrugated filter layer 15 and a flat filter layer 16 wherein the corrugated filter layer 15 and the flat filter layer 16 are joined to one another, in particular by gluing. As a result of the corrugation of the filter layer 15 between the two filter layers 15 and 16 flow channels 2 are formed and each flow channel 2 extends between a peak and the neighboring valleys 17 of the corrugations. In the finish-mounted state neighboring flow channels 2 in radial direction are separated from one another by the wall formed of the material of the corrugated filter layer 15. The wall is gas-permeable in order to enable gas passage between neighboring flow channels 2.

Figure 4:
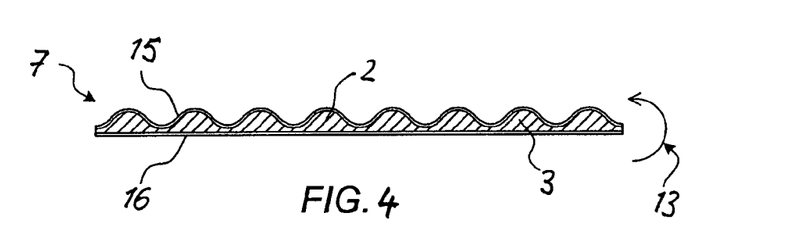
FIG. 4 a section illustration according to section line IV-IV of FIG. 2 with an illustration in accordance with FIG. 3, but with flow channels that are closed off by means of an adhesive.

In FIG. 4, that shows a section according to section line IV-IV of FIG. 2, the flow channels 2 are closed off by adhesive 3 in the area of the axial end face neighboring the lateral edge 10. The adhesive 3 is in particular introduced in the form of an adhesive bead across the length of the lateral edge 10.

Figure 5:
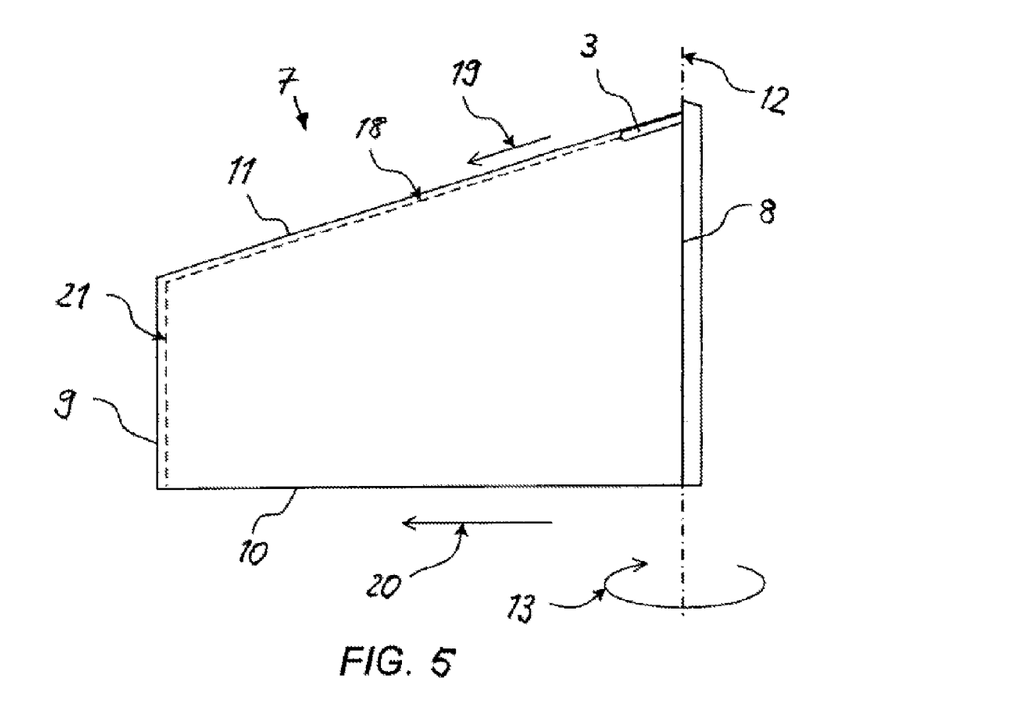
FIG. 5 a representation according to FIG. 2 of a flat, spread-out trapezoidal filter sheet with an adhesive bead that is to be applied additionally along the lateral edge of the filter sheet that are angularly disposed.

In FIG. 5, the filter sheet 7 is shown at the beginning of the rolling process in which the longer terminal edge 8 has already been rolled minimally in the direction of the arrow 13 about the axis 12. Simultaneous to the rolling process that is realized in the advancing direction 20 between the first terminal edge 8 and the second terminal edge 9 by means of an adhesive applicator an adhesive bead 3 is applied along the oblique-angled lateral edge 11 in the direction of arrow 19 wherein the direction of arrow 19 is parallel to the lateral edge 11 and thus also oblique relative to the terminal edges 8 and 9. The adhesive bead 3 is applied along a path 18 that is located immediately at the outer side of the lateral edge 11.

Also, along the shorter terminal edge 9 adhesive is applied along a path 21 extending parallel to the outer side of the terminal edge 9.

The adhesive beads 3 along the first orthogonal lateral edge 10 (FIG. 2) and the second oblique-angled lateral edge 11 (FIG. 5) are preferably applied onto different lateral faces of the filter sheet 7.

Figure 6:
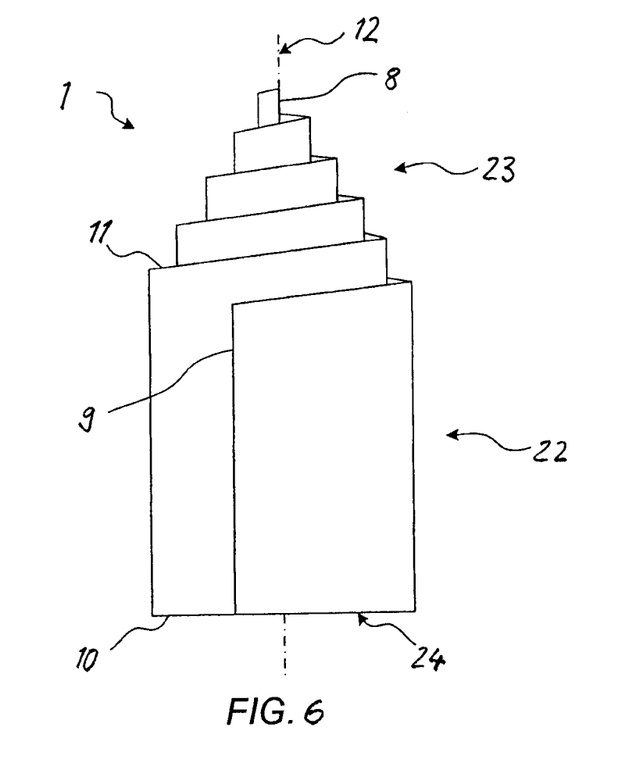
FIG. 6 the filter element in rolled state.

In FIG. 6, the completed rolled filter element 1 is illustrated. As a result of the obliquely extending lateral edge 11 as well as the fact that the rolling process has been started with the longer terminal edge 8, in the completed rolled state a filter element with a cylindrical section 22 and a conical section 23 is provided. The cylindrical section 22 has an end face 24 where all flow channels extending in axial direction 12 end together. In the oppositely positioned conical section 23 however the flow channels, depending on the radial position of the flow channels, end at different axial spacings.

Figure 7:
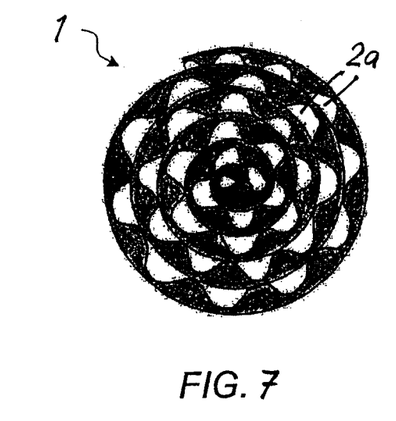
FIG. 7 the filter element in a plan view from above.
Figure 8:
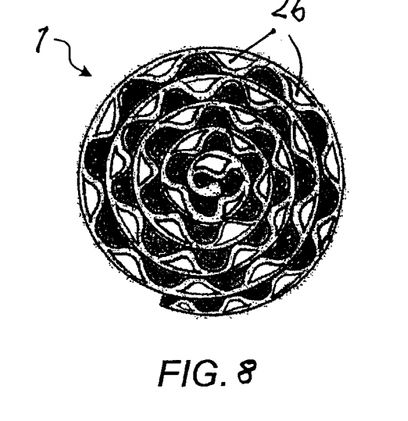
FIG. 8 the filter element in a plan view from below.

In FIG. 7, the completed rolled filter element is shown in plan view. It can be seen that the flow channels 2a in the area of the conically shaped section 23 are open. In FIG. 8, however, the filter element 1 is illustrated in a bottom view; here, the flow channels 2b are open. In the area of the conical section as well as in the area of the cylindrical section the end faces of immediately neighboring flow channels are embodied to be alternatingly open or closed off.

Figure 9:
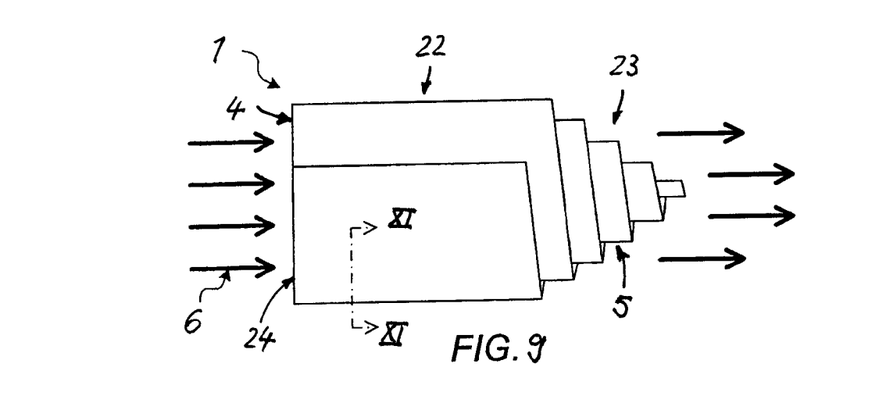
FIG. 9 the rolled filter element in a further view with added flow-indicating arrows.

In FIG. 9 the completed rolled filter element 1 with the cylindrical section 22 and the conical section 23 are illustrated with the flow arrows indicating the flow direction 6. The inflow side 4 coincides with the end face 24 at the cylindrical section 22. The through-flow is axial; the purified fluid exits the filter element 1 in the area of the conical section 23 where the outflow side 5 is located.

Figure 10:
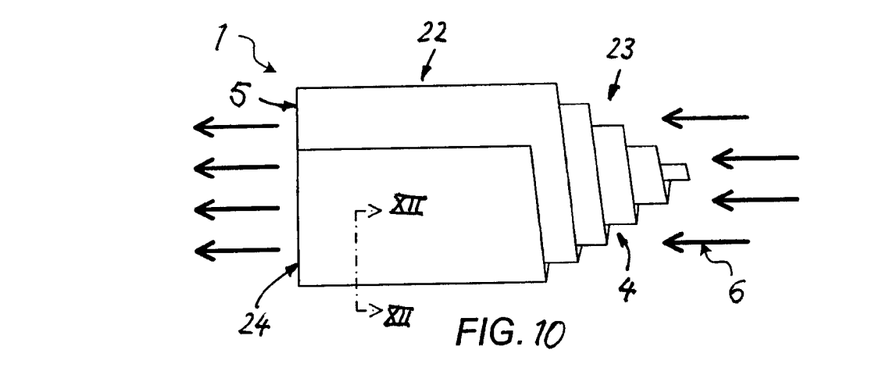
FIG. 10 the rolled filter element with flow guided in opposite direction.

In FIG. 10 the flow conditions are shown in reverse; the flow direction 6 in conical section 23 is through the cylindrical section 22 from the conical section 23 where the inflow side 4 is formed. The outflow side 5 coincides with the end face 24 of the cylindrical section 22.

Figure 11:
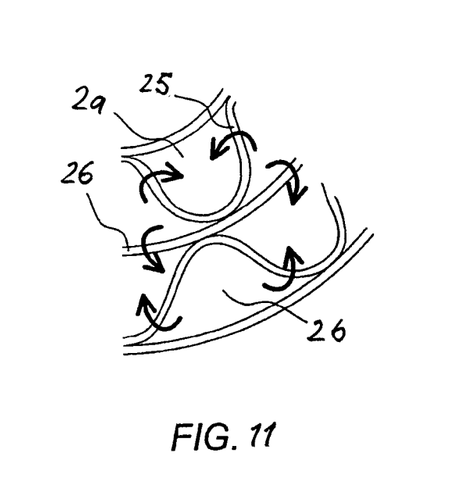
FIG. 11 a section according to section line XI-XI of FIG. 9 with an illustration of flow passing between neighboring flow channels FIG. 12 a section according to section line XII-XII of FIG. 10.

As shown in FIG. 11, showing a section along section line XI-XI of FIG. 9, the fluid flows into the filter element through the flow channels 2b that are open at the inflow side and passes within the filter element through walls 25 and 26, delimiting the flow channels 2b into the neighboring flow channels 2a through which the axial discharge of the purified fluid takes place. Upon passing through the walls 25, 26 the fluid is purified.

Figure 12:
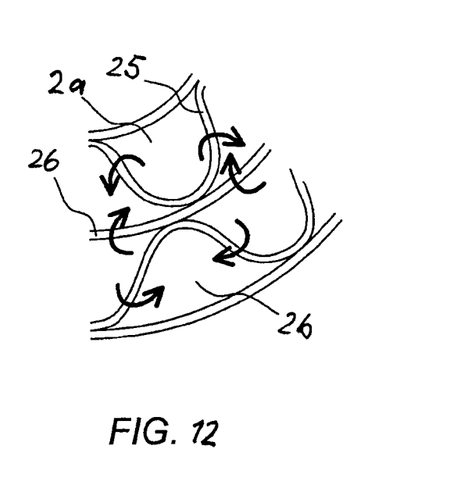

In FIG. 12, a section according to section line XII-XII of FIG. 10 is illustrated. In comparison to the preceding embodiment, in this embodiment inflow into the filter element is in opposite direction. Accordingly, the unfiltered fluid is introduced into the flow channels 2a and passes radially through the walls 25, 26 wherein during this process the fluid is purified. The fluid passes then into the parallel extending flow channels 2b, through which the purified fluid is axially discharged.

Figure 13:
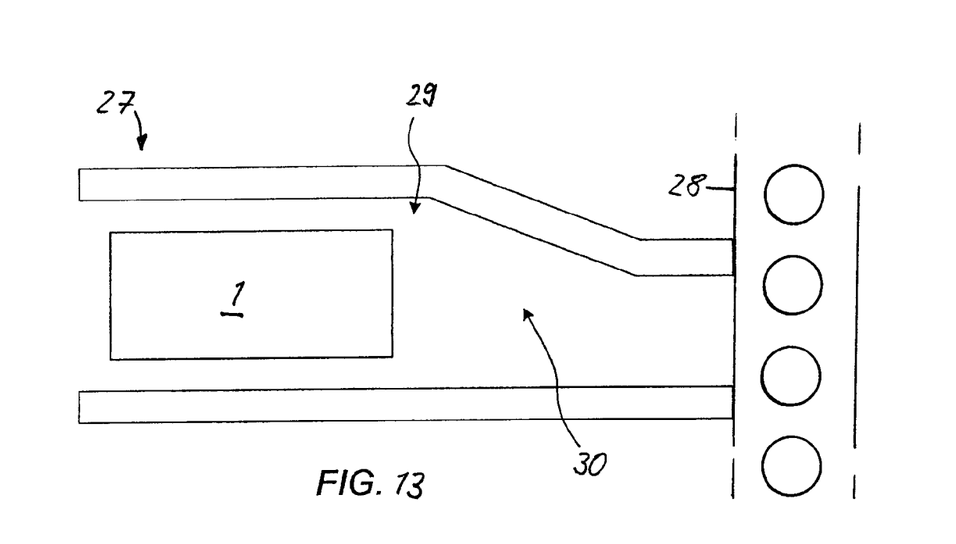
FIG. 13 in a schematic illustration an intake passage of an internal combustion engine which tapers in the direction toward the internal combustion engine, with integrated filter element of conventional build.

In FIG. 13, an intake module 27, that is correlated with an internal combustion engine 28 and through which combustion air is supplied to the internal combustion engine, is illustrated with a filter element 1 that is embodied in conventional form and is arranged in the intake passage 29 of the intake module. The filter element 1 has a cylindrical shape and is flowed through in axial direction by the incoming combustion air. The intake passage 29 has downstream of the filter element 1 on the side facing the internal combustion engine 28 a tapering section 30 with reduced cross-section. The filter element 1 is arranged upstream of this section 30 with reduced cross-section.

Figure 14:
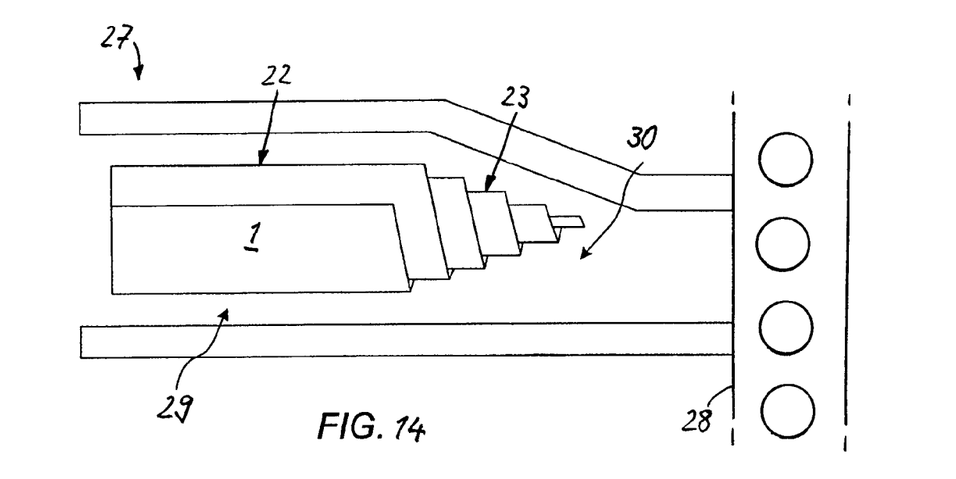
FIG. 14 an illustration in accordance with FIG. 13 but with the filter element according to the invention.

In contrast to this, in the embodiment according to FIG. 14 an intake module 27 with a filter element 1 according to the invention is illustrated whose cylindrical section 22 is positioned in the cylindrically shaped part of the intake passage 29 and whose conical section 23 projects into the section 30 with reduced cross-section. It is apparent that the mounting space available in the intake passage for receiving the filter element 1 is utilized better in the embodiment according to FIG. 14, despite the reduced cross-section in the section 30. In this way, for same mounting space a filter element 1 with enlarged filter surface area can be used.

The invention claimed is:

1. An air filter device for filtration of gaseous fluids in internal combustion engines, comprising:
   a spirally wound filter element (1) including:
      a spirally rolled filter sheet (7) having first and second oppositely positioned axial end faces and provided with parallel extending flow channels (2a, 2b) for the fluid extending between said end faces, said spirally rolled filter sheet having radially inwardly positioned windings and radially outwardly positioned windings;
      wherein said radially outwardly positioned windings have a different axial length than said radially inwardly positioned windings;
   wherein said flow channels of said filter element vary in length with said differing axial lengths of said radially outwardly positioned and said radially inwardly positioned windings;
   wherein neighboring flow channels of said parallel flow channels are alternatingly open or closed off at oppositely positioned axial end faces of said filter element;
   wherein said parallel flow channels in said rolled state end at different axial positions at one of said axial end faces of said filter element;
   wherein said filter element at said second end face is provided with a geometry deviating from that of said first end face;
   wherein all of said parallel extending flow channels at the second oppositely positioned end face of the filter element end are positioned in a common end face plane at identical axial positions;
   wherein said end face with said parallel extending flow channels ending at identical axial positions forms an inflow side and said oppositely positioned end face forms an outflow side (4) of said filter element;
   wherein said filter sheet (7) in the not-yet rolled spread-out state forms a generally trapezoidal shape with oppositely positioned parallel terminal edges (8,9) having different lengths;
   wherein said terminal edges (8,9) represent the start of rolling or the end of rolling of said filter element;
   wherein said second lateral edge (11) between the terminal edges (8,9) is curved.

2. Filter device according to claim 1, wherein said oppositely positioned terminal edges (8,9) at one of their terminal points are connected with one another by a first straight lateral edge (10) that extends at a right angle to the two terminal edges (8,9).

3. Filter device according to claim 1, wherein an adhesive bead (3) each is applied onto the filter sheet (7) along each lateral edge (10, 11).

4. Filter device according to claim 1, wherein said filter sheet (7) is embodied as a corrugated filter layer (15).

5. Filter device according to claim 1, wherein
   said oppositely positioned terminal edges (8,9) at one of their terminal points are connected with one another by a first straight lateral edge (10) that extends at a right angle to the two terminal edges (8,9);
   wherein said end face of the filter element (1) where the flow channels (2a, 2b) in the rolled state end at different axial positions has a cone shape;
   wherein an adhesive bead (3) is arranged on said filter sheet (7) along each lateral edge (10, 11), said bead securing said filter sheet into form of said spirally wound filter element (1);
   wherein said filter sheet (7) is embodied as a corrugated filter layer (15).

6. An intake module of an internal combustion engine with a filter device according to claim 1, wherein the filter device is arranged in an intake passage (29) with a non-constant cross-section.

* * * * *